(No Model.)
M. A. BRASS.
DISH WASHER.
No. 244,540. Patented July 19, 1881.
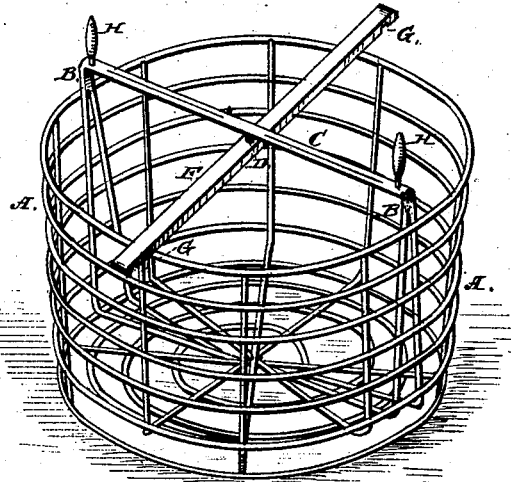
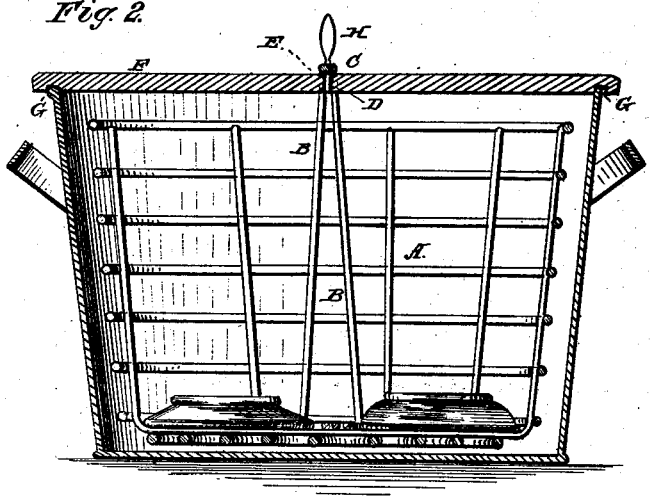
Witnesses:
Fred G. Dieterich
J. R. Littell
Inventor:
Margaret A. Brass,
by C. A. Snow & Co
her Attorneys.

UNITED STATES PATENT OFFICE.

MARGARET A. BRASS, OF JUNIATA, NEBRASKA.

DISH-WASHER.

SPECIFICATION forming part of Letters Patent No. 244,540, dated July 19, 1881.

Application filed January 10, 1881. (No model.)

*To all whom it may concern:*

Be it known that I, MARGARET A. BRASS, of Juniata, in the county of Adams and State of Nebraska, have invented certain new and useful Improvements in Dish-Washers; and I do hereby declare that the following is a full, clear, and exact description of the invention, which will enable others skilled in the art to which it appertains to make and use the same, reference being had to the accompanying drawings, which form a part of this specification.

Figure 1 is a perspective view of my improved dish-washer; and Fig. 2 is a vertical sectional view, showing the same in position for operation.

Similar letters of reference indicate corresponding parts in both figures.

This invention relates to dish-washers; and it consists in certain improvements in the construction of the same, which will be hereinafter fully described, and particularly pointed out in the claim.

In the drawings hereto annexed, A represents a basket, made of galvanized wire or other suitable material in the shape of an ordinary dish-pan. Said basket is provided at diametrically opposite sides with upward-projecting arms B, connected by a cross-bar, C, so as to form a bail, as shown. The cross-bar C is provided at its center with a downward-projecting pin or pivot, D, working in an opening, E, in a wooden or metallic bar, F, placed across the basket under the bail B C. The ends of bar F are notched upon the under sides, as shown at G G, so as to permit the said bar to be adjusted upon the rim of a dish-pan of a larger size than the basket A, which is thus held suspended in such pan. The cross-bar C is provided with upward-projecting handles H, by which the device may be manipulated.

The operation of my invention will be readily understood. The dishes to be washed are placed in the basket A, which is suspended in a pan of hot water, where the basket is oscillated by means of one or both of the handles until the dishes are clean. They are then rinsed in a similar manner in a panful of clean water, after which they may be set away to drain and dry.

By this device, which is simple and inexpensive, the dishes may be thoroughly washed in less time and in a more satisfactory manner than when a dish-cloth is used.

Having thus described my invention, I claim and desire to secure by Letters Patent of the United States—

As an improvement in dish-washers, the basket A, having bail B C, provided with a downward-projecting pin or stud, D, and handles H, in combination with the cross-bar F, having perforation E and notches G G, substantially as and for the purpose set forth.

In testimony that I claim the foregoing as my own I have hereto affixed my signature in presence of two witnesses.

MARGARET A. BRASS.

Witnesses:
SAMUEL L. BRASS,
EDWARD L. JANES.